UNITED STATES PATENT OFFICE.

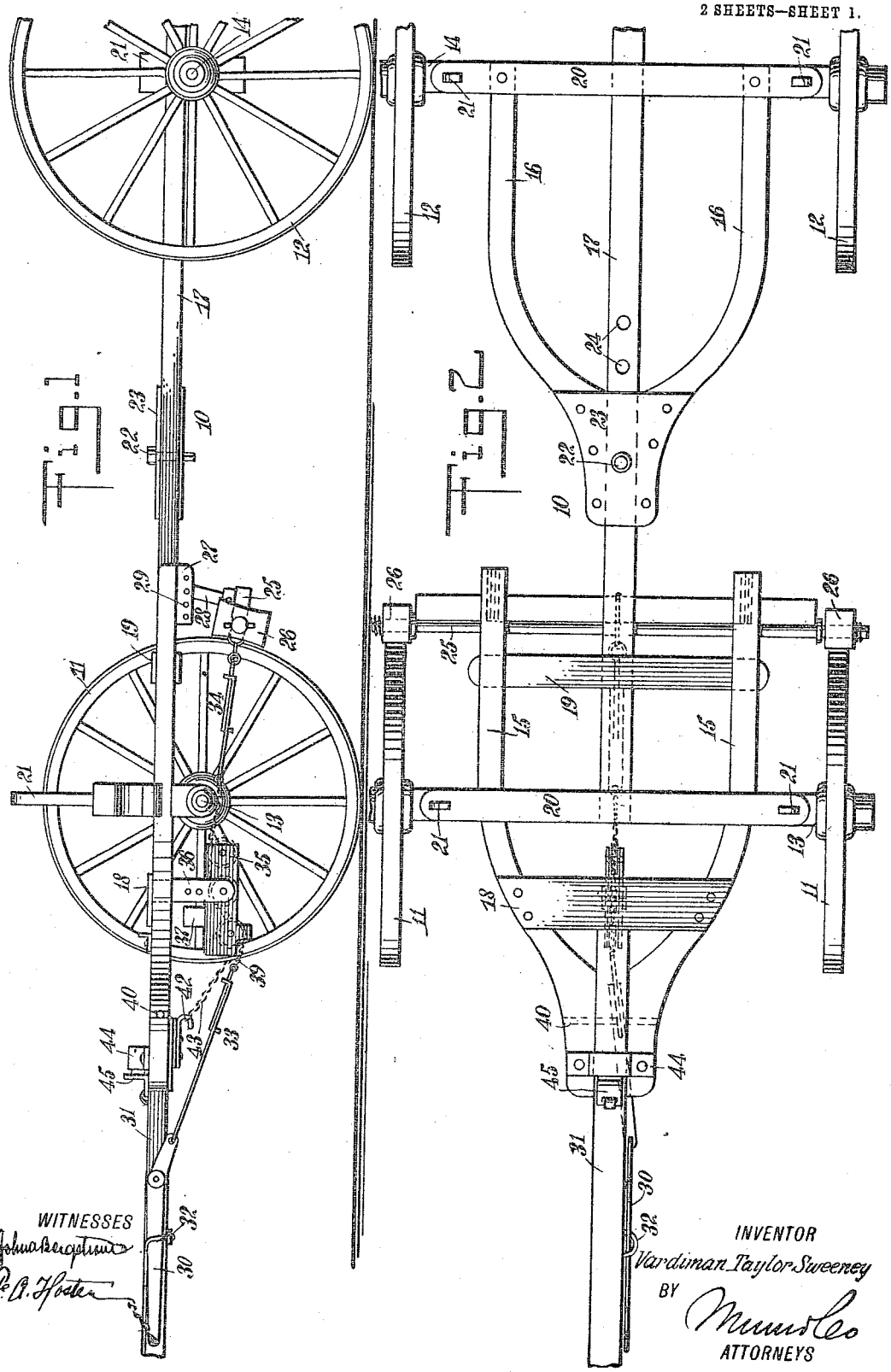

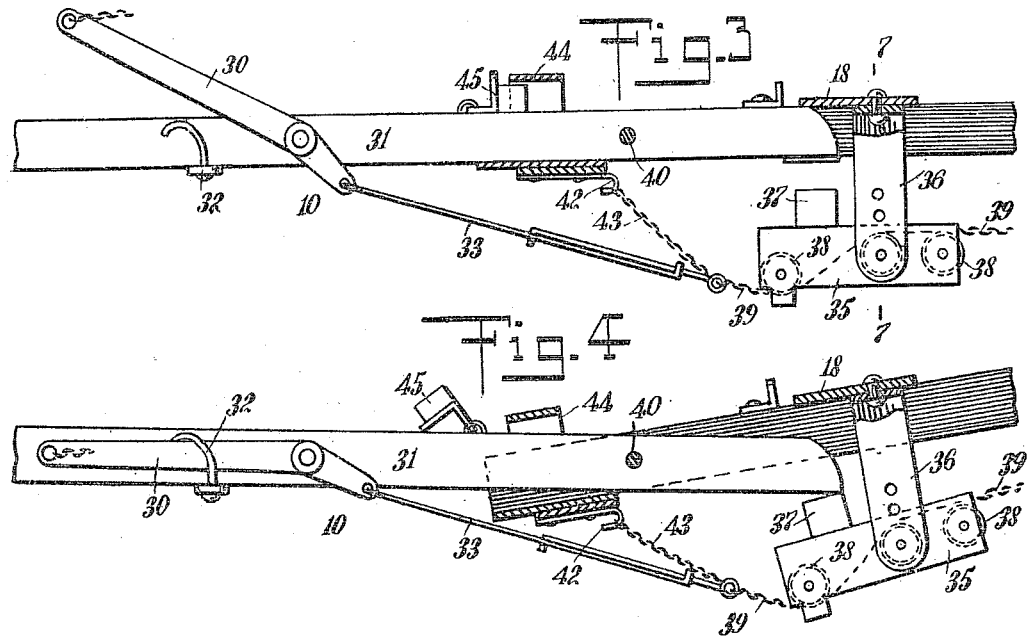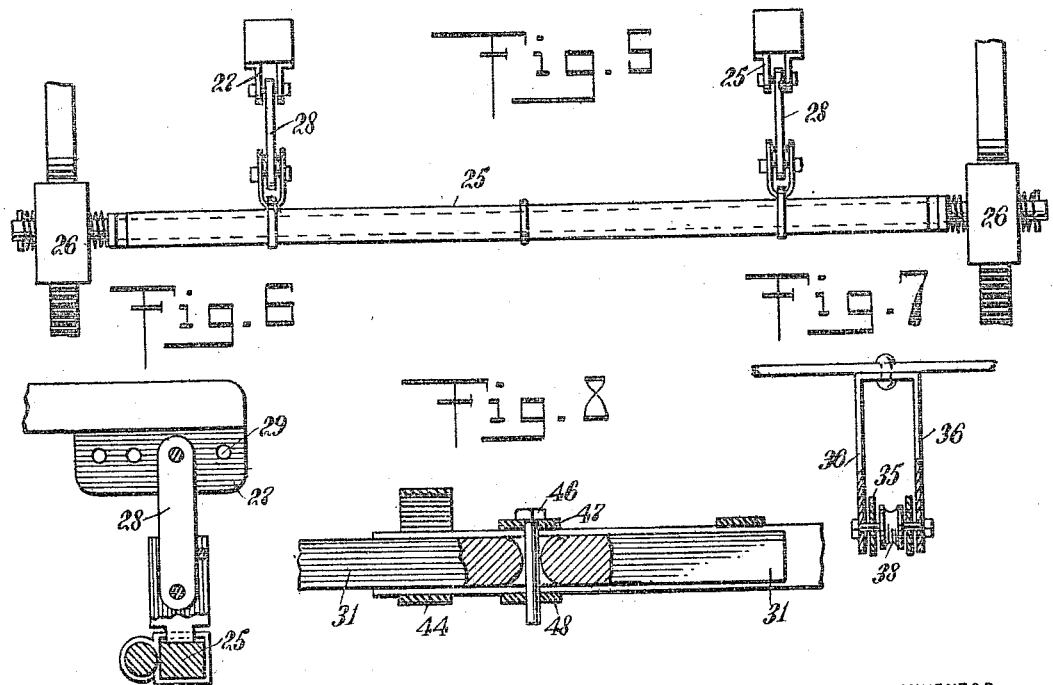

VARDIMAN TAYLOR SWEENEY, OF ANCHORAGE, KENTUCKY.

VEHICLE-BRAKE.

957,632.  Specification of Letters Patent.  Patented May 10, 1910.

Application filed October 27, 1909.  Serial No. 524,832.

*To all whom it may concern:*

Be it known that I, VARDIMAN TAYLOR SWEENEY, a citizen of the United States, and a resident of Anchorage, in the county of Jefferson and State of Kentucky, have invented a new and Improved Vehicle-Brake, of which the following is a full, clear, and exact description.

My invention relates to vehicle brakes applicable to various kinds of vehicles, and has for an object to provide a vehicle brake having improvements upon the construction of the vehicle brake for which Letters Patent were granted to me December 15, 1896, No. 513,246.

An object of my invention is to provide a brake having means to manually operate the brake and control the same and also to provide means connected with the said brake, whereby the same may be automatically operated by the action of the team attached to the vehicle, in backing, the manually-controlled means and the automatic means being independently operative to apply or release the said brake.

A further object of my invention is to provide a tiltable tongue, adapted to operate the brake when the tongue is tilted, and having thereon locking means for releasably locking the tongue to the running gear of the vehicle, to hold the same in a rigid position relative to the said running gear.

A still further object of my invention is to provide a casing having numerous pulleys and a flexible adjustable connection adapted to pass over the said pulleys, and forming the connecting means between the brake and the means for operating the same.

Reference is to be had to the accompanying drawings, forming a part of this specification, in which similar characters of reference denote corresponding parts in all the figures, and in which—

Figure 1 is a side elevation of a vehicle equipped with my invention, parts being broken away, and showing the relative positions of the different parts when the shoes of the brake beam are disengaged from the wheels of the vehicle; Fig. 2 is a plan view of the same, parts being broken away; Fig. 3 is a fragmentary side elevation, parts being broken away and in section, showing the position of the manually controlled lever when the brake is operated by the same; Fig. 4 is a similar view, but showing the automatic braking means as applied, and the hand lever in inoperative position; Fig. 5 is a fragmentary rear view of the brake beam and shoes and the hangers forming a part thereof; Fig. 6 is a detail sectional view of the adjustable brake beam; Fig. 7 is a detail sectional view of the casing, taken on the line 7—7 in Fig. 3; and Fig. 8 is a view of a modified form of a part of my invention, showing partly in section the tiltable tongue and method of pivotally securing the same.

A vehicle 10 is provided, having front wheels 11 and rear wheels 12, mounted upon suitable axles 13 and 14 respectively. Front hounds 15 and rear hounds 16, comprising the running gear, are secured to the axles 13 and 14, and an adjustable reach 17 is disposed intermediate the wheels 11 and 12. Suitable cross pieces 18 and 19 are disposed transversely of the forward hounds 15, and guide pieces 20 having standards 21 therein, are secured over the front and rear axles 13 and 14. A pin 22 removably fitted into a hole in a plate 23 attached to the reach 17 and the rear hounds 16, adapted to fit holes 24 in the reach 17, permits of extending the reach 17 to a convenient and suitable length.

A brake beam 25 having thereon shoes 26 for engagement with the wheels 11, is provided and is connected to plates 27 by a link 28 pivotally secured to the brake beam 25. Each plate 27 is provided with a series of holes 29 adapted to receive the pin securing the link 28 to the plate 27, thereby permitting of adjusting the brake beam 25 to suit different sizes of wheels, and at the same time permitting of reducing or increasing the frictional power of the shoes 26 on the wheels 11. A manually controlled lever 30 is pivotally secured to a tongue 31, and a suitable clamp 32 is provided, also pivoted to the tongue 31, for removably holding the lever 30 in an inoperative position. Secured to the lever 30 is an adjustable link 33, and secured to the brake beam 25 is a similar adjustable link 34. The adjustable links 33 and 34 each comprise two longitudinal members, one of said members having a terminal thereof formed into an eye, and the other member having a terminal thereof formed into a hook bent at right-angles to the said member. Suitable perforations are provided in the eye member, and the hook member is adapted to be passed through the said eye, the hook on the said hooked member being adapted to fit into one of the various perforations in the eye member, thereby forming a link capable of being quickly and positively adjusted. A casing 35 is pivoted to links 36 secured to the cross piece 18, the links 36 having suitable perforations therein for adjusting the height of the casing 35, and secured to the said casing 35 is a block 37. Pulleys 38 are disposed in the casing 35, and a flexible connection 39, preferably a chain or the like, is passed over and under the said pulleys 38 and connected with the link 33 and the link 34, as will be clearly seen by referring to Figs. 1, 4 and 5.

The tongue 31 is mounted intermediate the hounds 15 and pivotally secured thereto by a pin 40, thereby permitting the tongue 31 to tilt vertically. A hook 42 is provided on the under side of the tongue 31, and a chain 43 is connected with the hook 42 and the flexible connection 39. A flanged member 44 is secured to the hounds 15 by means of suitable bolts, and a locking member 45 is provided, hingedly secured to the tongue 31 and adapted to removably engage the flanged member 44, as will be readily seen by referring to Figs. 3 and 4.

Now, when the vehicle 10, having a team hitched thereto, is moving along a level surface, and it is desired to stop the same or slow down, an upward pull exerted on the lever 30, which has been previously released from engagement with the holder 32, causes the connection 39, attached to the links 33 and 34, to operate the brake beam 25, thereby forcing the brake shoes 26 into frictional engagement with the rims of the wheels 11, and stopping the vehicle. If, on the other hand, the vehicle is moving down an incline or is being backed, and it is desired to apply the brakes, the locking member 45 is pushed out of engagement with the flanged member 44, thereby causing the tongue 31, which is being forced upwardly by the strain exerted by the team, to tilt, and the heel end of the tongue 31 engages the block 37, which in turn exerts a pull on the connection 39, and forces the brake shoes 26 into frictional engagement with the rims of the wheels 11. When the tongue 31 returns to its normal position, the pull on the connection 39 is released, thereby releasing the brake shoes 26, as will be easily understood. On the other hand, if the vehicle is moving down an incline, and there is no perceptible upward pull on the tongue 31, the vehicle 10 will tilt, and the block 37 will engage the heel of the tongue, thereby applying the brake shoes 26, as will be easily observed in Fig. 4.

It will be understood that the lever braking means are manually controlled, while the second braking means are automatic, and that the said braking means can be applied independently of one another, or both can be operated at the same time to stop or slow down the vehicle.

In Fig. 8 is shown a modification of a part of my invention. In the previous views, the tongue 31 is shown as pivoted to the running gear by a pin 40 passed horizontally through a part of the running gear and the tongue, as may be easily seen by referring to Fig. 4, while in the modification, a pin 46 is passed vertically through a cross piece 47 on the running gear and the tongue 31, and through a second cross piece 48 on the under side of the running gear. This construction as shown likewise enables the tongue 31 to be tilted, as is also the case with the first described construction, in which the pin is inserted horizontally through the tongue.

It will be noticed that the shoes 26 are loosely held on the brake beam 25, so that the same can be turned, thereby permitting of using either side of the shoes for engagement with the wheels 11.

Having thus described my invention, I claim as new and desire to secure by Letters Patent:—

1. In a vehicle, the combination of a brake having a brake beam carrying shoes thereon, a casing mounted to swing on the running gear of the vehicle, a tongue pivoted on the said running gear, and a flexible connection between the said brake beam and the forward portion of the running gear and passing through the said casing, the said tongue being adapted to engage the said casing and impart a swinging motion thereto to tighten the said connection for moving the said brake shoes in active position.

2. In a vehicle, the combination of a brake having a brake beam, shoes on the said brake beam, a pivoted casing provided with pulleys mounted to swing on the running gear of the vehicle, a tongue pivoted on the said running gear, and a connection between the said brake beam and the forward portion of the running gear, having a flexible portion and adjustable portions, the said flexible portion being adapted to pass over and under the said pulleys, and the said tongue being adapted to engage the said casing and impart a swinging motion thereto to tighten the said connection for moving the said brake shoes in active position.

3. In a vehicle, the combination of a brake having a brake beam carrying shoes thereon, a casing mounted to swing on the running gear of the vehicle, a flexible connection between the said brake beam and the forward portion of the running gear and passing through the said casing, a manually controlled lever pivotally mounted on the tongue of the vehicle, and releasable locking means on the said tongue for holding the said lever in locked position thereon, the said lever being attached to the said connection to tighten the same for moving the said brake shoes in active position when the said lever is operated.

4. In a vehicle, the combination of a brake, having a brake beam, shoes on the said brake beam, a pivoted casing provided with pulleys mounted to swing on the running gear of the vehicle, a connection between the said brake beam and the forward portion of the running gear, having a flexible portion and adjustable portions, the said flexible portion being adapted to pass over and under the said pulleys, a manually controlled lever pivotally mounted on the tongue of the vehicle, and releasable locking means on the said tongue for holding the said lever in locked position thereon, the said lever being attached to the said connection to tighten the same for moving the said brake shoes in active position, when the said lever is operated.

5. In a vehicle, the combination of a brake having a brake beam, shoes on the said brake beam, a tiltable tongue mounted on the forward part of the running gear of the vehicle, a flexible connection between the said tongue and the said brake beam, a casing provided with pulleys mounted to swing on the said running gear and having the said connection passed therethrough, the said tongue being adapted to engage the said casing, when the said tongue is tilted, to tighten up the said connection for moving the said brakes shoes into active position, and locking means on the said tongue and the said running gear for releasably locking the said tongue to the said running gear, to prevent the said tongue from tilting.

6. In a vehicle, the combination of a brake having an adjustable brake beam, shoes on the said brake beam, a pivoted casing provided with pulleys mounted to swing on the running gear of the vehicle, a tiltable tongue pivoted on the said running gear, a connection between the said brake beam and the forward portion of the said running gear, having a flexible portion and adjustable portions, the said flexible portion being adapted to pass over and under the said pulleys, and the said tongue being adapted to engage the said casing and impart a swinging motion thereto, to tighten the said connection for moving the said brake shoes in active position, means on the said tongue and the said running gear for releasably locking the said tongue to the said running gear to inoperatively hold the same, a manually controlled lever pivotally mounted on the said tongue, and releasably locking means on the said tongue for holding the said lever in inoperative position, the said lever being attached to the said connection to tighten the same for moving the said brake shoes in active position, when the said lever is operated, the said lever and the said tiltable tongue being adapted to be independently operated relative to each other or operated in unison, to move the said brake shoes into active position.

In testimony whereof I have signed my name to this specification in the presence of two subscribing witnesses.

VARDIMAN TAYLOR SWEENEY.

Witnesses:
C. E. BEYNROTH,
L. S. WITHERBEE.